United States Patent Office 3,516,807
Patented June 23, 1970

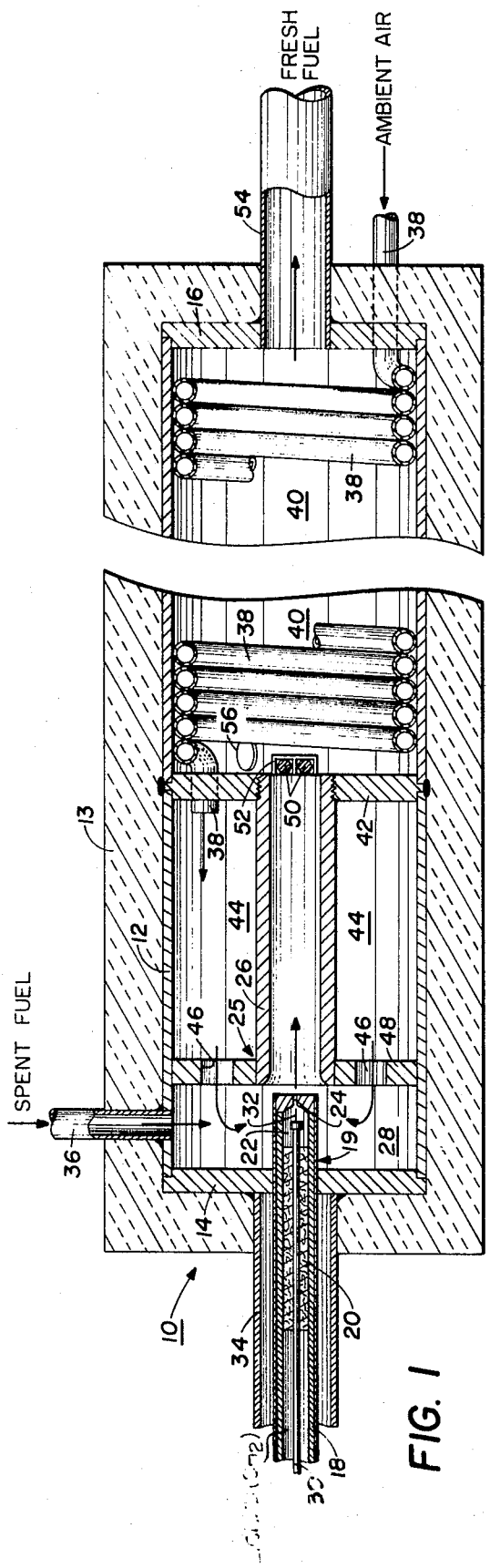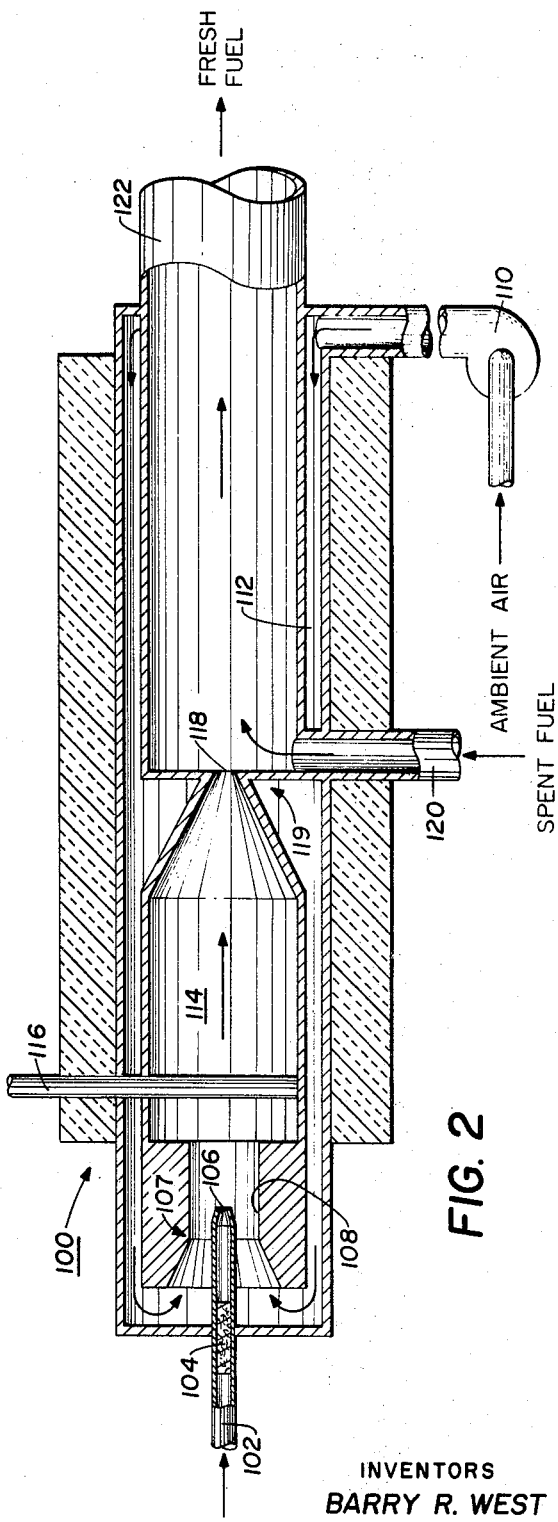

3,516,807
APPARATUS FOR PRODUCING HYDROGEN GAS BY THE PARTIAL OXIDATION OF A CARBONACEOUS FUEL CONTAINING HYDROGEN
Barry R. West and Foster L. Gray, Dallas, Tex., assignors to Texas Instruments Incorporated, Dallas, Tex., a corporation of Delaware
Filed Apr. 6, 1966, Ser. No. 540,577
Int. Cl. C10g 9/04; F23d 11/44
U.S. Cl. 48—107
3 Claims

ABSTRACT OF THE DISCLOSURE

A partial oxidizer featuring a jet pump which utilizes the pressure of one reactant stream to pump another reactant stream into the reactor. In one embodiment of the invention, the vapor pressure of the liquid fuel is used to draw air through a regenerative heat exchanger in the reactor and then inject the air and the vapors of fuel as a mixture into the reactor where it is partially oxidized. Provision is also made for recycling a portion of the spent fuel stream from the fuel cell and injecting the spent fuel along with the fuel-air mixture into the reactor so that carbon monoxide and water present in the spent fuel stream will prevent deposition of carbon as the product gases from the oxidation reaction are cooled in the heat exchanger and system.

---

This invention relates generally to the formation of hydrogen gas, and more particularly relates to a partial oxidizer for producing a hydrogen rich stream from a liquid hydrocarbon or the like for use in a fuel cell system.

Various fuel cell systems have heretofore been proposed for producing electrical energy from the formation of water from hydrogen and oxygen. An efficient fuel cell system for generating electrical energy can be devised when pure hydrogen is available as a fuel. However, preparation of pure hydrogen requires rather expensive, large scale and complex equipment. As a result, the use of pure hydrogen is impractical from the standpoint of competing with conventional electrical power. Various attempts have been made to use hydrocarbons or other carbonaceous fuels containing hydrogen in one form or another in a fuel cell. For example, attempts have been made to directly react methanol at the fuel electrode of the fuel cell. In other systems, the hydrocarbon is cracked externally of the fuel cell and the cracked product is reacted at the fuel electrode of the cell. Catalytic reforming of the hydrocarbon to prepare a feed fuel for a cell system is also known in the art. In general, the various fuel cell systems have had serious shortcomings, such as very low efficiency and susceptibility to operational deterioration, usually by catalyst poisoning. Moreover, elaborate and relatively large equipment is usually required to produce relatively small quantities of electrical power.

In copending U.S. application Ser. No. 326,103, entitled "Method and Apparatus for Producing Energy," filed Nov. 26, 1963 by James K. Truitt et al. and assigned to the assignee of this invention, a system for producing electrical energy from carbonaceous fuel containing hydrogen is described wherein a fuel feed stream containing free hydrogen is obtained by partially oxidizing the carbonaceous fuel in an amount of air inadequate for complete combustion. The resulting fuel stream includes free hydrogen and carbon monoxide as well as nitrogen and other gases from the air and this fuel stream is contacted with the fuel electrode where only the hydrogen is used. The quantity of free hydrogen in the stream can be increased by raising the temperature at which the reaction is carried out. In this type of system, the fuel cell and partial oxidizer are located in a controlled ambient maintained at about 650° C. These systems have heretofore required the use of compressors or blowers to move the various reactant streams, and usually the blowers were required to handle gas streams at 650° C. or higher, thus placing severe strains on the blowers. In small units, it is very difficult to properly meter the small volume of liquid fuel required to operate the system.

Therefore, an object of this invention is to provide an improved partial oxidizer for producing a relatively small stream of hydrogen rich fuel gas for operating a fuel cell from a hydrocarbon or other carbonaceous fuel containing hydrogen.

Another important object is to provide such an apparatus for producing the hydrogen rich gas from a liquid fuel containing carbon and hydrogen.

Still another object is to provide a partial oxidizer which requires no compressors or blowers for operation.

Still another object is to provide such a partial oxidizer that operates at a relatively high temperature so that the reaction will proceed more rapidly.

A further object is to provide a partial oxidizer that is compact and relatively inexpensive.

Yet another object is to provide such a partial oxidizer wherein spent fuel from the fuel cell containing water vapor can be used to prevent deposition of carbon as the reactant stream is cooled prior to introduction to the fuel cell and within the fuel cell.

These and other objects are accomplished by a partial oxidizer featuring a jet pump which utilizes the pressure of one reactant stream to pump another reactant stream. In one embodiment of the invention, the vapor pressure of a liquid fuel is used to draw air through a regenerative heat exchanger in the reactor and then inject the air and the vapors of fuel as a mixture into the reactor where it is partially oxidized. Provision is also made for recycling a portion of the spent fuel stream from the fuel cell and injecting the spent fuel with the fuel air mixture into the reactor so that the carbon monoxide and water in the spent fuel stream will prevent deposition of carbon as the product gases from the oxidation reaction are cooled in the regenerative heat exchanger and subsequently in the system.

In another embodiment of the invention, the pressure of the product in the reaction zone is used in a jet pump to recycle a portion of the spent fuel from the fuel cell to cool the products stream preparatory to introduction to the fuel cell. The water in the spent fuel stream also provides the reactants for a water gas shift conversion to increase the yield of hydrogen.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

FIG. 1 is a longitudinal sectional view of a partial oxidizer constructed in accordance with the present invention; and FIG. 2 is a schematic longitudinal sectional view of another partial oxidizer constructed in accordance with the present invention.

Referring now to the drawings, and in particular to FIG. 1, a partial oxidizer constructed in accordance with the present invention is indicated generally by the reference numeral 10. The oxidizer 10 comprises a cylindrical shell 12 having end plates 14 and 16. Insulation 13 retains the heat produced within the oxidizer.

Liquid hydrocarbon, or other carbonaceous fuel containing hydrogen, is supplied through a vapor generator indicated generally by the reference numeral 19. The vapor generator 19 is comprised of a porous wick-like material 20 and a vapor chamber 22 formed at the end of tube 18. The wick-like material 20 forms an interface between the liquid in tube 18 and the vapor in the chamber 22, both of which are under pressure. The wick-like material also acts as a heat exchanger for transferring heat to the liquid. The vapor generator is heated by the partial oxidation reaction as will presently be described to generate vapor from the liquid. A very small orifice 24 is disposed in the end of the tube 18 so that vapors generated in the vapor chamber 22 will pass through the orifice as a relatively high velocity jet stream.

A jet pump, indicated generally by the reference numeral 25, is formed by the juxtaposition of the end of tube 18 and the end of a mixing tube 26. The mixing tube 26 is in fluid communication with an air chamber 28 through the annulus between the end of the tube 18 and the end of the tube 26. The vapor stream is accelerated to a high velocity through the orifice 24 and causes a pumping action on the air in chamber 28 and draws air from the air chamber 28. The air and vapors are thoroughly mixed as they pass through the mixing tube 26. The tube 18 is slidably disposed in the end wall 14 so as to adjust the size of the annular area between the end of the tube 18 and the end of the mixing tube 26, and thus regulate the air-fuel ratio. A rod 30 is reciprocally disposed in the tube 18 and the porous wick-like material 20. A needle 32 is positioned at the end of the rod 30 for cleaning the orifice 24. Access to the rod 30 is gained by removing a cap (not illustrated) over the end of the tube 18, and the fuel being introduced to the tube 18 through a T connection (not illustrated). The tube 18 extends through a tubular housing 34 which is connected to the end plate 14 by a good peripheral seal. A suitable annular sealing means (not illustrated) is provided between the end of the tubular housing 34 and the tube 18 so as to permit the tube 18 to be reciprocally adjusted and yet maintain the chamber 28 airtight.

Spent fuel from a fuel cell may be introduced to the air chamber 28 through conduit 36. Ambient air is introduced to the air chamber 28 through a heat exchanger coil 38 which extends through the end plate 16 and is coiled around the walls of a reaction chamber 40 before passing through the partition 42, which supports one end of the mixing tube 26, into an intermediate chamber 44. The air then passes through apertures 46 in a partition 48, which supports the other end of the mixing tube 26, to the air chamber 28. The fuel vapor emanating from the orifice 24 and the air pumped from the air chamber 28 are injected through the mixing tube 26 into the reaction chamber 40. A flame holder, comprised of a pair of rods 50 which are disposed at the end of the mixing tube 26 and extend transversely of the tubular housing 12, changes the velocity of the fuel-air stream as it is injected into the reaction chamber to stabilize the flame in the reaction. A bracket 52 holds the rods in position. The reaction products pass from the reaction chamber 40 through tube 54. The combustible products in the reaction chamber may be ignited by a suitable ignition means passed through opening 56. Opening 56 may be closed by a cap (not illustrated) to seal the reaction chamber.

In the operation of the partial oxidizer 10, the outlet tube 54 is connected to supply the reaction products to the fuel inlet of a fuel cell. The fuel outlet of the fuel cell is preferably connected to inlet tube 36 so that a portion of the spent fuel from the cell will be recycled through the partial oxidizer. The fuel cell typically operates at about 650° C. The partial oxidizer 10 and the fuel cell will customarily be placed in the same insulated chamber and the temperature within the chamber maintained substantially at the operating temperature of the fuel cell by a suitable thermostatically controlled burner. Prior to start up, the chamber, and therefore the partial oxidizer 10, is heated to the operating temperature so that vapor is generated from the liquid fuel in the vapor generator the supply pressure of which will be sufficiently high that the jet pump 25 will initiate a flow of a combustible mixture of air and fuel. The mixture of fuel and air may then be ignited by a suitable ignitor passed through the opening 56, which may then be sealed. The flame stabilizer rods 50 cause an abrupt change in the velocity of the fuel-air mixture from the mixing tube 26. As a result, the flame is stabilized, even during start up, in the reaction chamber at a point where the velocity of the flame front equals the velocity of the fuel-air stream. As a result of the combustion, the temperature of the partial oxidizer rises appreciably and the temperature of the entire device rises. This increases the temperature of the incoming air passing through the heat exchanger and the partial oxidizer in general until equilibrium is achieved. The reaction products then pass from the reaction chamber through the outlet tube 54 to the fuel cell. The jet pump provides sufficient energy to draw air in through the regenerative heat exchanger, deliver the reaction products to the fuel cell, and establish recirculation of a portion of the spent fuel from the fuel cell.

The reaction carried out in the partial oxidizer 10 is:

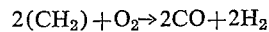

$$2(CH_2) + O_2 \rightarrow 2CO + 2H_2$$

The $O_2$ comes from air so that a substantial quantity of nitrogen as well as other gases are present in the final reaction product stream fed to the fuel cell. The $(CH_2)$ represents a hydrogen bearing carbonaceous fuel, typically a liquid hydrocarbon such as kerosene, JP4 or diesel fuel. The process should be carried out at a temperature in excess of about 1200° C. in order for the reaction to proceed rapidly. As a result of the partial oxidation reaction, the temperature of the fuel-air mixture is raised by an increment of temperature less than the 1200° C. at which the reaction should be carried out for best results. For this reason, it is highly desirable to heat the incoming air by the regenerative heat exchanger coil 38. Then the fuel-air mixture introduced to the reaction chamber will be at a sufficiently high temperature that the additional rise in temperature produced by the partial combustion reaction will result in a temperature sufficiently high to efficiently produce hydrogen. It will be appreciated that the spent fuel returning through tube 36 is already at an elevated temperature since the fuel cell operates at about 650° C. The insulation 13 assists in retaining the increment of temperature resulting from the partial oxidation reaction. The heat exchanger 38 also assists in cooling the walls of the combustion chamber 40 and cools the reaction products passing through the outlet tube 54 to a temperature more nearly matching that at which the fuel cell is operated so that the requirement for additional cooling is materially reduced. The carbon dioxide and water introduced through tube 36 modify the composition of the reaction product stream so that carbon is not deposited in the system as the stream subsequently cools to the operating temperature of the fuel cell.

Thus, it will be noted that by using a liquid fuel and the vapor generator 19, the pressure of the fuel vapor can be utilized to operate the jet pump. The jet pump provides sufficient energy to operate the partial oxidizer and pump the resulting fuel stream through the fuel cell. This eliminates the need for a fan or blower to pump the high temperature gases and reduces the size of the system. The vaporizer and jet pump also provide a means for accurately metering the very small volume of the liquid fuel necessary to operate relatively small fuel cell systems and thoroughly mixing the fuel and air. The flame holder 50 stabilizes the flame during cold start up and further suppresses flame instability when the reactor is hot. As mentioned, the regenerative counter-flow heat exchanger 38 increases the efficiency of the partial oxidizer, cools the walls of the reaction zone 40, reduces the insulation required, and cools the resulting product stream. The addition of the spent fuel provides water and carbon dioxide to prevent the deposition of carbon in the system.

Referring now to FIG. 2, another partial oxidizer constructed in accordance with the present invention is indicated generally by the reference numeral 100. In the partial oxidizer 100, liquid fuel is introduced through a tube 102 to a vapor generator 104. The vapor from the generator 104 passes through an orifice 106 of a first jet pump 107 into a mixing tube 108. Cool ambient air is compressed by a blower 110 operating in the ambient air and is passed through the jacket of a counterflow, regenerative heat exchanger 112 to the jet pump where it is introduced to the mixing tube 108. The mixture of air and fuel is then partially oxidized in the reaction chamber 114 as heretofore described in connection with the partial oxidizer 10. Flame stabilizer rods 116 are provided adjacent the end of the mixing tube 108. The reaction product stream is then forced through the restrictive orifice 118 of a jet pump 119 at relatively high velocity. Spent fuel from the fuel cell is drawn in through tube 120 by the jet pump and mixed with the reaction product stream to cool the combined stream. The combined stream then passes through an outlet tube 122, either directly to a fuel cell, or through a shift converter and then to the fuel cell.

The chemical process carried out in the partial oxidizer 100 is substantially the same as that carried out in the partial oxidizer 10. However, the compressor 110 is used to pump the air into the reaction chamber 114, rather than the pressure of the fuel vapor. The combined pressure of the air and fuel vapor is then used to recycle a portion of the spent fuel from the fuel cell to cool the reaction products to a temperature only slightly greater than the temperature at which the fuel cell operates. For example, for a one kilowatt fuel cell system, the fuel and air mass flow is 3.7 lbs. per hour at approximately 1200° C. The spent fuel stream flow is 8.8 lbs. per hour at 650° C., this quantity representing about one-half of the spent fuel from the fuel cell. When these streams are mixed, the resulting flow from the partial oxidizer 100 is 12.5 lbs. per hour at 810° C. Only slight additional cooling, if any, is required to inject this fuel into a fuel cell operating at 650° C. The ambient air pressure required to achieve a pressure in the reaction chamber 114 sufficient to pump the spent fuel from inlet tube 120 is on the order of 1–2 p.s.i.g. This pressure can readily be achieved using a relatively small compressor operating at ambient temperature. This eliminates the need for a blower or fan to transport the high temperature gases within the fuel cell system.

Although preferred embodiments of the invention have been described in detail, it is to be understood that various changes, substitutions and alterations can be made therein without departing from the spirit and scope of the invention as defined by the appended claims.

What is claimed is:

1. A partial oxidizer for producing a fuel feed stream containing free hydrogen for a fuel cell from a carbonaceous fuel containing hydrogen comprising:

(a) a reaction chamber,
 (b) vapor generator means in heat exchange relationship with the reaction chamber producing vapor from liquid fuel,
 (c) air chamber means for supplying air,
 (d) heat exchange means interconnecting a source of fresh air and the air chamber means and in heat exchange relationship with the reaction chamber for supplying air to the air chamber and for heating the air and cooling the products from the reaction chamber,
 (e) jet pump means in fluid communication with the vapor under pressure and the air chamber for utilizing the pressure of the vapors to inject the vapors and the air into the reaction chamber in relative quantities to produce partial oxidation, and
 (f) means for introducing spent fuel from a fuel cell into the air chamber whereby the spent fuel will be injected into the reaction chamber with the vapor and air.

2. The partial oxidizer defined in claim 1 further characterized by means at the inlet of the reaction chamber for changing the flow velocity of the vapor and air mixture as it enters the reaction chamber to stabilize the location of the oxidation flame within the reaction chamber.

3. A partial oxidizer for producing a fuel feed stream containing free hydrogen for a fuel cell from a carbonaceous fuel containing hydrogen comprising a reaction chamber, first jet pump means for mixing vapors of the carbonaceous fuel and air, means for supplying vapors of the carbonaceous fuel, means for compressing ambient air, heat exchanger means for conducting the compressed air by the reaction chamber in heat exchange relationship to the reaction chamber and delivering the air to the mixing means, second jet pump means for directing the products from the reaction chamber as a high velocity stream, and means for supplying spent fuel from a fuel cell to the second jet pump means whereby the spent fuel will be mixed with the product stream to cool the combined streams preparatory to introduction to a fuel cell.

References Cited

UNITED STATES PATENTS

| | | | |
|---|---|---|---|
| 2,011,034 | 8/1935 | Chilowsky | 48—107 |
| 2,013,809 | 9/1935 | Salisbury | 23—277 |
| 2,179,378 | 11/1939 | Metzger | 260—679 |
| 2,384,463 | 9/1945 | Gunn et al. | 136—86 |
| 2,970,178 | 1/1961 | Braconier et al. | |
| 3,087,532 | 4/1963 | Beach et al. | 431—350 X |
| 3,097,686 | 7/1963 | Morrow | 431—115 X |
| 3,220,803 | 11/1965 | Billi | 23—277 |
| 3,266,938 | 8/1966 | Parker et al. | |

JOSEPH SCOVRONEK, Primary Examiner

U.S. Cl. X.R.

23—277; 48—212; 136—86; 431—115, 217, 350